Patented Dec. 5, 1933

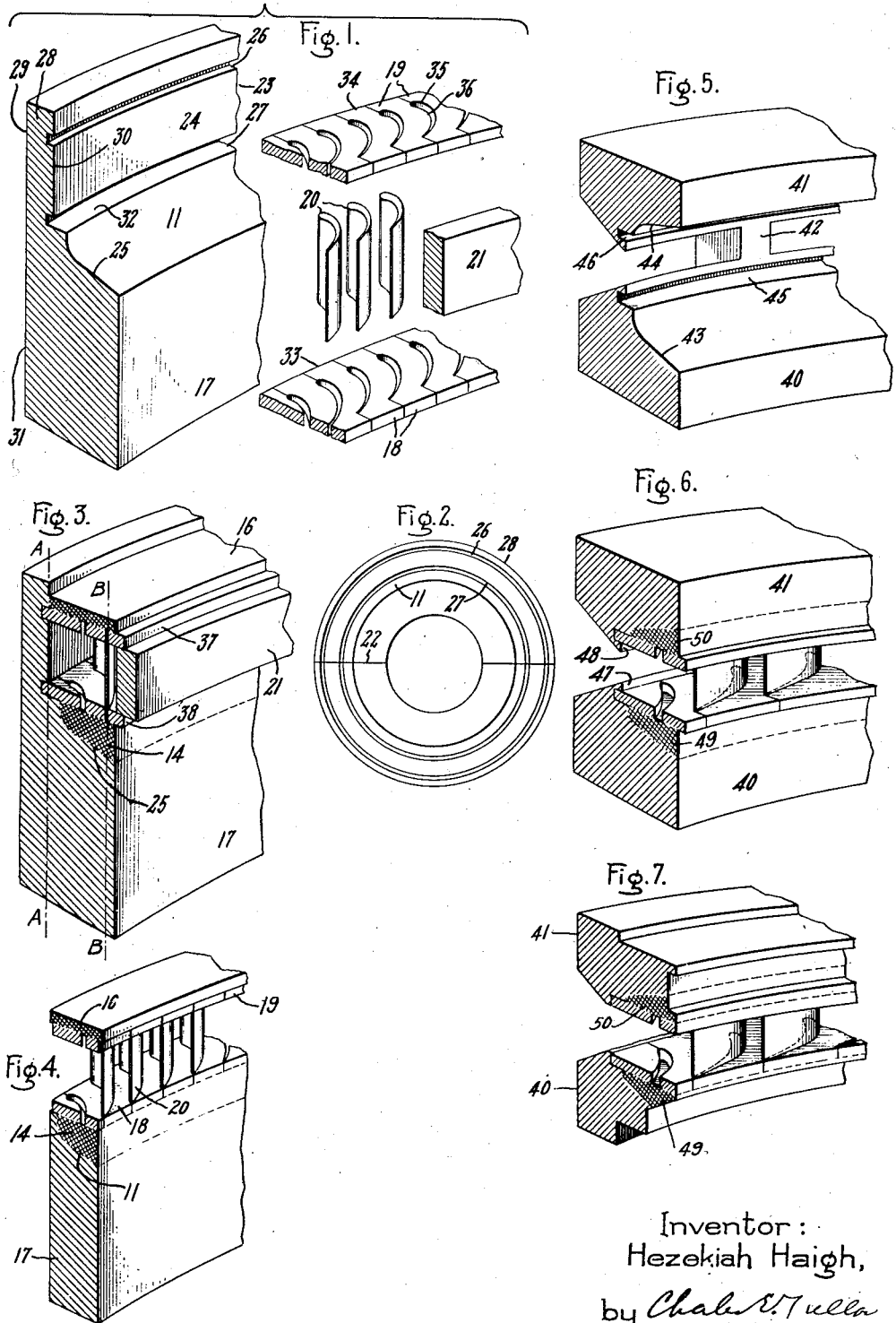

1,938,382

UNITED STATES PATENT OFFICE 1,938,382

METHOD OF MANUFACTURING NOZZLE DIAPHRAGMS AND THE LIKE

Hezekiah Haigh, Scotia, N. Y., assignor to General Electric Company, a corporation of New York Application March 17, 1933. Serial No. 661,309

7 Claims. (Cl. 29—156.8)

The present invention relates to a method of manufacturing nozzle diaphragms and like bladed structures in which a plurality of blades or partitions are held by and securely fastened to holding members, for instance, a disk and an outer ring. Structures of this type are used for instance in elastic fluid turbines for conducting and directing the elastic fluid from a higher to a lower turbine stage.

One object of my invention is to provide an improved method of manufacturing such structures whereby the assembling is facilitated and the finished structures form rigid bodies with the various parts integrally united to each other.

For a consideration of what I believe to be novel and my invention, attention is directed to the following description and the claims appended thereto, in connection with the accompanying drawing.

In the drawing, Fig. 1 is a perspective view of parts utilized in carrying out my invention; Fig. 2 is a face view of one of the parts shown in Fig. 1; Figs. 3 and 4 show successive steps utilized in carrying out the invention; and Figs. 5, 6, and 7 illustrate steps of a modified form of my invention.

Referring first to Fig. 4, which illustrates a turbine nozzle diaphragm made in accordance with my invention, the nozzle diaphragm comprises an inner ring in the present instance shown as a portion of an annular disk 17 having an outer portion 11 cut away to form a recess. A plurality of lower spacers 18 and the ends of partitions 20 located between the spacers are welded to the disk by means of welding material 14 filling the recess 11. The outer ends of the partitions 20 are spaced apart and maintained in spaced relation by upper spacers 19 located between adjacent ends of the partitions and welded together to the ends of the partitions by means of welding material 16. The welding material 16 forms a backing of substantial dimensions for uniting the spacers and the blades. Viewed from another angle, the backing forms an outer shroud band for the nozzle diaphragm; that is, the welding material 16 serves to replace the outer shroud ring or band provided in nozzle structures heretofore made.

Referring now to Fig. 1, the parts for making a nozzle diaphragm in accordance with my invention are the block or disk 17, the lower spacers 18, upper spacers 19, blades or partitions 20, and a spacing member 21. The block 17 forms in the present instance an annular disk split along a horizontal plane 22 through its axis, as shown in Fig. 2.

In accordance with the method of my invention I cut away an outer or circumferential portion of the block or disk to form a recess 23, the confines of which form a plane wall 24 and a curved wall 25. Two parallel annular or uniformly spaced grooves 26 and 27 are formed in the plane wall 24.

From another viewpoint, I form a block or disk with a circumferentially extending portion 28 which has an outer side 29 and an inner side 30. The outer side 29 is in the present instance located in a plane with one side 31 of the disk, and the inner side 30 forms a shoulder 32 with another outer portion of the disk. A part of the shouldered portion is cut away to form the groove or recess 11, and grooves 26 and 27 are cut into the inner side or wall of the extending portion 28. The extending portion 28 with the grooves 26, 27 of the disk serves as a means for holding the spacers and partitions on the disk during their assembly.

In assembling, the edges 33 of the lower spacers 18 are inserted in the groove 27 and the edges 34 of the upper spacers are inserted in the groove 26. The blades or partitions 20 are inserted between adjacent spacers. Each spacer has a front wall 35 and a rear wall 36 conforming to the shape of the blades.

During assembly, the disk is preferably placed on a table with the outer side 31, 29 in contact with the table. The inner and outer spacers are then inserted in the grooves and a blade or partition is provided between each pair of spacers. After the spacers and blades are thus assembled, I provide in accordance with the method of my invention the spacing block 21 (Fig. 1) between the outer edges 37 and 38 of the spacers (Fig. 3) to prevent displacement of the spacers during the welding process which forms the next step in the manufacturing method. The groove or recess defined between the curved wall portion 25 of the disk and the inner spacers and the inner end surfaces of the partitions is filled with welding material 14 forming an inner backing to firmly unite the inner spacers and the partitions or blades with the disk. On the outer surfaces of the outer spacers 19 and the outer end surfaces of the blades I provide a layer of fused metal, preferably welding material 16, forming an outer backing or band to weld the outer spacers and blades together and thus maintain the parts in their relative position to each other (Fig. 3). After the various parts have thus been assembled and rigidly united by welding, I remove the spacing block 21 and finally turn off portions from the two sides of the block or disk, and the edges of the spacers as indicated by the dash-dotted lines A—A and B—B in Fig. 3. With these portions removed the structure shown in Fig. 4 is obtained. From another viewpoint, I remove during the last step of my method at least a portion of the extension 28 (Fig. 1) of the disk, which portion served merely as a means for holding the various parts together during the assembly.

Referring now to Figs. 5 to 7 inclusive, where I have shown a modification of the method for manufacturing a nozzle structure in accordance with my invention, a block or disk is made comprising inner and outer ring members 40 and 41 respectively, concentrically arranged to each other and integrally united and held in spaced relation by webs 42. Each of the members has an inner curved wall 43 and 44 respectively, provided with annular grooves 45 and 46 respectively. The grooves 45 and 46 correspond to the grooves 26 and 27 in Fig. 1 and serve for holding the spacers and the partitions or blades during the assembly of the structure. The blades and the partitions are the same as those shown in Fig. 1.

During assembly I may insert two spacers in the groove 45 with a partition therebetween and thereafter two spacers in the groove 46 adjacent the partition, etc. After the spacers and partitions have been assembled in the block or disk, the recesses defined by the curved walls 43 and 44 with the adjacent surfaces of the spacers and the ends of the partitions are filled with welding material 49 and 50 respectively, as shown in Fig. 6. Thereafter wall portions 47 and 48 defining the grooves 45 and 46 are removed and other portions of the rings are turned off to obtain the desired shape of the structure, as indicated in Fig. 7. The webs 42, which originally serve to unite the two concentric members 40 and 41, may be turned off although this is not necessary. In case they are not removed, however, the blades or partitions should be arranged so that a partition will be located in front of each web. This is important to avoid the web becoming an obstacle against the flow of steam through the turbine.

With my invention I have provided a method for manufacturing a bladed structure, such as a nozzle diaphragm, in which the various parts of the structure are rigidly united to each other to form an integral unit. The assembling of the structure which forms a substantial item in the manufacturing cost is considerably simplified and the manufacturing cost accordingly reduced.

What I claim as new and desire to secure by Letters Patent of the United States, is:

1. The method of manufacturing a bladed body comprising a disk, a plurality of blades, each of which has one end secured to the disk, and an outer band secured to the other ends of the blades, said method comprising making a block having two grooves, assembling spacers with their edges held in the grooves and blades held between the spacers, welding the spacers and blades to the block, and providing an outer backing of welding material to form an outer band.

2. The method of manufacturing a bladed structure comprising making a disk having a circumferential extension on its rim, providing two concentric grooves in the extension, assembling spacers with their edges held in the grooves and partitions held between the spacers, filling a recess defined by the inner spacers and a portion of the disk with welding material, and providing an outer ring member by means of welding material fused onto the outer surfaces of the spacers and the ends of the partitions, and removing at least a portion of the extension of the disk.

3. The method of manufacturing a bladed structure comprising making a block with two grooves, assembling spacers with their edges held in the grooves and partitions intermediate the spacers, and welding the outer surfaces of the spacers to the end surfaces of the partitions and to the block.

4. The method of manufacturing a diaphragm comprising making a disk having an outer annular recessed portion and annular concentric grooves in the recessed portion, assembling spacers with their edges held in the grooves and partitions between the spacers, inserting spacing means between the outer edges of the spacers, welding the outer surfaces of the spacers and the ends of the partitions to the disk, removing the spacing means, and removing at least the portion of the disk intermediate the annular grooves.

5. The method of manufacturing a diaphragm comprising making a disk having a circumferential radially extending portion, the inner side of the portion defining a shoulder on the block, cutting two concentric grooves into the inner side of the extending portion, assembling spacers with their edges held in the grooves and partitions between the spacers, welding the inner spacers and the inner end surfaces of the partitions to the shoulder of the disk, welding the outer spacers and the outer end surfaces of the partitions together to form an outer shroud band, and cutting through and removing at least a portion of the circumferential radially extending disk portion.

6. The method of making a bladed body which comprises making a disk comprising two annular ring members united by webs, cutting two concentric grooves into the adjacent surfaces of said members, assembling spacers with their edges inserted in the grooves and partitions between the spacers, and filling the recesses defined between said members and the adjacent surfaces of the spacers and the end surfaces of the partitions with welding material.

7. The method of making a bladed body which comprises making two concentric ring members with cut-away edge portions, cutting two concentric grooves into the adjacent surfaces of said members, assembling spacers with their edges inserted in the grooves and partitions between the spacers, filling the recesses defined between the cut-away edge portions of said members and the adjacent surfaces of the spacers and the end surfaces of the partitions with welding material, and removing portions of the walls defining said grooves.

HEZEKIAH HAIGH.